United States Patent
Zeng et al.

(10) Patent No.: US 11,846,351 B2
(45) Date of Patent: Dec. 19, 2023

(54) PISTON HAVING OIL RETURN PASSAGE

(71) Applicants: MAHLE International GmbH, Stuttgart (DE); MAHLE Automotive Technologies (China) Co., Ltd., Shanghai (CN)

(72) Inventors: Shaobo Zeng, Shanghai (CN); Jianjun Zhu, Shanghai (CN)

(73) Assignees: MAHLE INTERNATIONAL GMBH; MAHLE AUTOMOTIVE TECHNOLOGIES (CHINA) CO., LTD.

( * ) Notice: Subject to any disclaimer, the term of this patent is extended or adjusted under 35 U.S.C. 154(b) by 0 days.

(21) Appl. No.: 17/983,363

(22) Filed: Nov. 8, 2022

(65) Prior Publication Data
US 2023/0145204 A1 May 11, 2023

(30) Foreign Application Priority Data
Nov. 9, 2021 (CN) .......................... 202122733618.7

(51) Int. Cl.
*F16J 1/08* (2006.01)
*F16J 1/04* (2006.01)
*F02F 3/22* (2006.01)

(52) U.S. Cl.
CPC ....... *F16J 1/08* (2013.01); *F02F 3/22* (2013.01); *F02F 3/225* (2013.01); *F16J 1/04* (2013.01)

(58) Field of Classification Search
CPC ....... F02F 3/22; F02F 3/225; F16J 1/04; F16J 1/08
See application file for complete search history.

(56) References Cited

U.S. PATENT DOCUMENTS

| 4,987,866 A * | 1/1991 | Mielke | F02F 3/025 |
| | | | 92/236 |
| 5,435,872 A * | 7/1995 | Penrice | F16J 1/08 |
| | | | 123/193.6 |

(Continued)

FOREIGN PATENT DOCUMENTS

| CN | 202832824 U | 3/2013 |
| CN | 208935361 U | 6/2019 |

(Continued)

OTHER PUBLICATIONS

KR102159566B1_t machine translation thereof (Year: 2020).*
English abstract for CN-208935361.
English abstract for CN-202832824.

*Primary Examiner* — Kenneth Bomberg
*Assistant Examiner* — Matthew Wiblin
(74) *Attorney, Agent, or Firm* — Fishman Stewart PLLC

(57) ABSTRACT

A piston with an oil return channel may include a piston head, a piston skirt, and an oil return hole. The piston head may include a ring groove. The piston skirt may be connected to the piston head. The piston skirt may have a surface including a concave face window. A connection between the face window and the ring groove may form a residual ring bank. The oil return hole may be formed by milling on the residual ring bank. The oil return hole may connect the ring groove close to the piston skirt with the face window. A depth of the oil return hole may be greater than a depth of the ring groove.

20 Claims, 4 Drawing Sheets

(56) References Cited

U.S. PATENT DOCUMENTS

| | | | | |
|---|---|---|---|---|
| 7,614,339 | B2* | 11/2009 | Fisher | F01M 9/00 |
| | | | | 92/159 |
| 10,584,659 | B2* | 3/2020 | Weinenger | F02F 3/26 |
| 10,690,247 | B2* | 6/2020 | Azevedo | F02F 3/0023 |
| 2002/0046593 | A1* | 4/2002 | Ribeiro | F02F 3/22 |
| | | | | 29/888.09 |
| 2021/0172523 | A1* | 6/2021 | Schneider | F02F 3/0015 |

FOREIGN PATENT DOCUMENTS

| | | | | |
|---|---|---|---|---|
| DE | 252638 A1 * | 12/1987 | | F02F 3/22 |
| KR | 102159566 B1 * | 9/2020 | | F16J 1/08 |

* cited by examiner

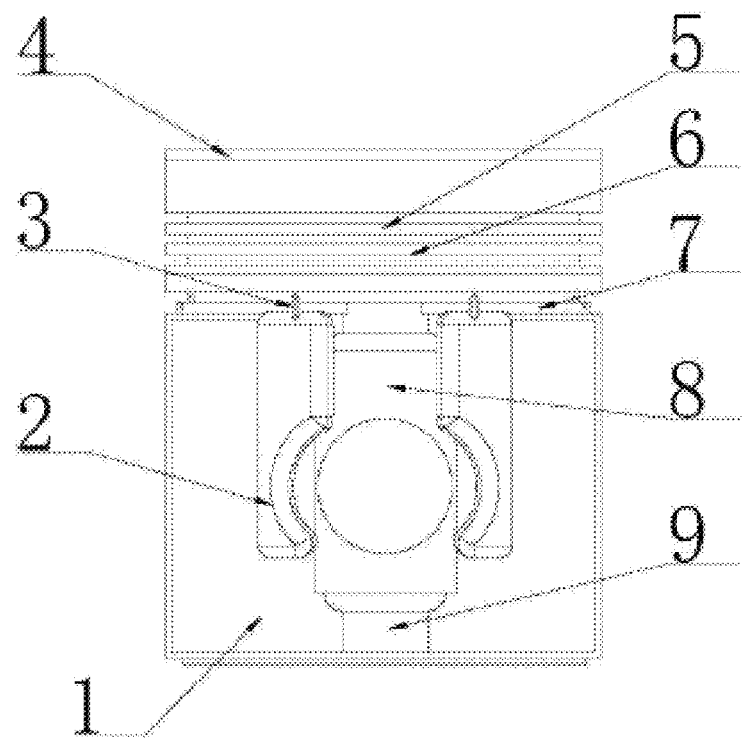
Fig. 1 – PRIOR ART
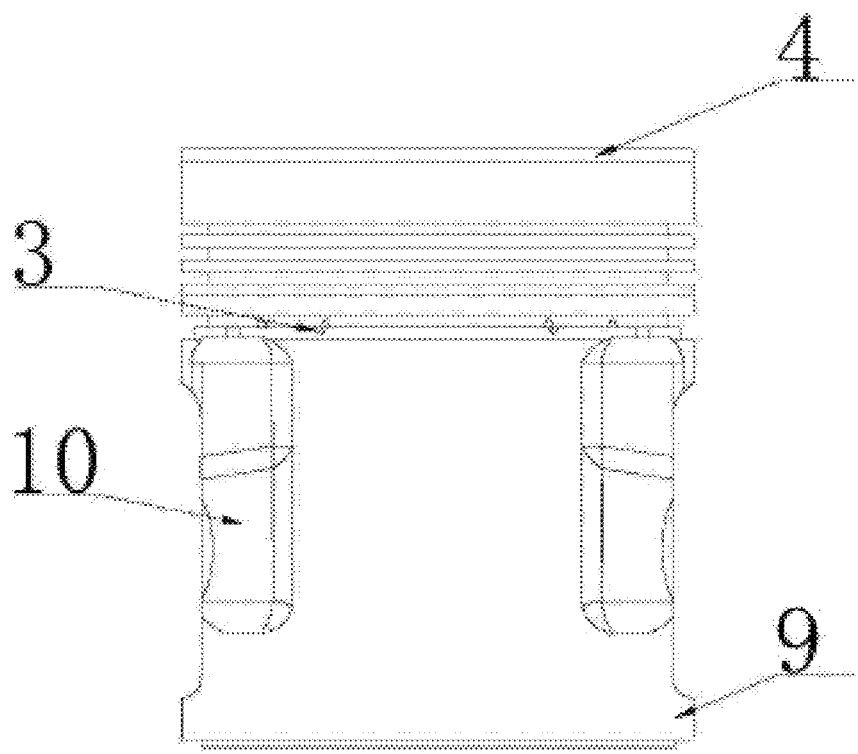
Fig. 2 – PRIOR ART

PISTON HAVING OIL RETURN PASSAGE

CROSS-REFERENCE TO RELATED APPLICATIONS

This application claims priority to Chinese Patent Application No. CN 202122733618.7, filed on Nov. 9, 2021, the contents of which is hereby incorporated by reference in its entirety.

TECHNICAL FIELD

The utility model relates to the field of an engine, and in particular to a piston having an oil return passage and an engine.

BACKGROUND

As one of the core components of the engine, the piston faces the challenge of higher durability and reliability requirements, the durability of the piston is one of the most important factors affecting the reliability of the engine, and improving the low engine oil consumption at the initial stage and in the durable service life can well ensure that the piston meets the requirements of emission regulations in the whole service life cycle. As an important link to reduce the durability of the engine oil consumption, the oil return hole needs to be designed reasonably to improve the oil return ability.

FIG. 1 and FIG. 2 show the designs of the existing oil return holes, however, the effective cross-section of oil return of the oil return holes is relatively small, which leads to the fact that the oil return hole arranged at an upper end of a skirt is unfavorable for reducing engine oil consumption at a low speed and a low load, and more engine oil is accumulated and stored at the upper end of the skirt and even is sucked up; small oil return cross-section is unfavorable for a large amount of engine oil return encountered at high speed and high load.

As an improvement, Patent No. CN202832824U introduces an improved oil return hole, wherein the oil return hole is arranged on a third ring land and communicates with a surface window to facilitate oil return; in Patent No. CN208935361U, oil storage grooves 7 are integrally formed on an upper surface of a skirt of the piston body 1, and in the actual cast or forged piston, the oil storage grooves are formed by machining, and a short-axis platform 9 is integrally formed at a lower end of a second oil return surface window 8. The short-axis platform in the piston structure is obviously protruding than the surface window, which is difficult to directly cast. A first oil return surface window 2, a blind oil return hole 3, a structural ceramic layer 4, a gas ring 5, an oil ring 6, and a third oil return surface window 10 are also described in CN208935361U.

SUMMARY

In view of this, embodiments of the present disclosure provide a piston having an oil return passage and an engine to solve the problems in the prior art.

In order to solve the above technical problems, the utility model provides a piston having an oil return passage, wherein the piston comprises:

a head, wherein the head is provided with a ring groove;
a skirt, wherein the skirt is connected to the head, the skirt has a surface provided with a recessed surface window, and a remaining ring land is formed at a connection between the surface window and the ring groove; and
an oil return hole, wherein the oil return hole is arranged on the remaining ring land and formed by milling the remaining ring land, the oil return hole communicates the ring groove close to the skirt with the surface window, and the oil return hole has a depth greater than that of the ring groove.

Furthermore, an opening of the oil return hole has a size larger than that of a bottom of the oil return hole.

Preferably, an axis of the oil return hole extends along a radial direction of the piston.

Preferably, a plurality of the oil return holes are provided, and the plurality of the oil return holes are symmetrically distributed on the remaining ring land.

Preferably, a difference between the depth of the oil return hole and the depth of the ring groove ranges from 0.5 mm to 1.0 mm.

Preferably, the oil return hole has a diameter ranging from Ø8 mm to Ø15 mm.

Preferably, the ring groove at least comprises a gas ring groove and at least one oil ring groove, the gas ring groove is positioned above the oil ring groove, and ring lands are arranged between the gas ring groove and a top end of the head, between the gas ring groove and the oil ring groove, and between the oil ring groove and the skirt.

Preferably, the gas ring groove is a wedge-shaped ring groove or a rectangular ring groove and is internally provided with a gas ring, and the oil ring groove is a rectangular ring groove and is internally provided with an oil ring and an oil ring supporting spring.

In a second aspect, an embodiment of the utility model provides an engine, further comprising the piston having the oil return passage described above.

The piston having the oil return passage and the engine provided by the utility model has the following beneficial effects:

1. the milling mode is adopted at a position of the remaining ring land in the present application, the oil return hole with a circular opening cross-section is machined by one-time feeding, and an opening of the oil return hole has a size larger than that of a bottom of the oil return hole, so that the circulation cross-section area of the engine oil is greatly increased, and specifically at least increased by 1 time; the machining mode of one-time feed milling has a simple machining path, so that the production cost is greatly reduced and the machining speed is improved;
2. an opening of the oil return hole of the present application has a size larger than that of a bottom of the oil return hole, and the oil return hole is communicated with the surface window, so that the engine oil is difficult to accumulate and store in the oil return hole, and the problem that the engine oil accumulated and stored in the oil return hole is sucked to a combustion chamber is difficult to occur when the engine runs in an idling mode or runs at a low speed and in small load mode, thereby reducing the consumption of the engine oil and improving the problem of exhaust emission;
3. the oil return hole of the present application has a depth greater than a diameter depth of a third ring groove, so that the risk of burr production is reduced, and the risk that steel scraps are difficult to separate during machining is avoided.

BRIEF DESCRIPTION OF THE DRAWINGS

FIG. 1 is a structural schematic view of an oil return hole in the prior art;

FIG. 2 is a side cross-sectional structural schematic view of FIG. 1;

In the figures, 100 is a head; 11 is a first ring groove; 12 is a second ring groove; 13 is a third ring groove; 14 is a first ring land; 15 is a second ring land; 16 is a third ring land; 17 is a remaining ring land; 18 is a gas ring; 19 is an oil ring; 110 is an oil ring supporting spring; 111 is an oil return hole; 20 is a skirt; 21 is a surface window.

DETAILED DESCRIPTION

In order to more clearly illustrate the above purpose, features and advantages of the present application, specific embodiments of the present application will be described in detail in this section with reference to the accompanying drawings. In addition to the various embodiments described in this section, the present application can also be implemented in other different ways; those skilled in the art can make corresponding improvements, modifications and replacements without departing from the spirit of the present application, therefore, the present application is not limited to the specific embodiments disclosed in this section. The protection scope of the present application shall be subject to the claims.

High B10 life is one of the main features of the current and next-generation engine technology upgrading; meanwhile, the engine oil replacement mileage of the existing trucks is extended to 100,000 kilometers, and will be further extended to 150,000 or even 200,000 kilometers in the future, and the China's stage 6 vehicle emission standards put forward new requirements on the durability of emissions, especially the requirements on the NOx and particulate matters are likely to be strict in the future. This puts forward stricter requirements on the initial engine oil consumption and the durability of the engine oil consumption. As one of the core components of the engine, the piston faces the challenge of higher durability and reliability requirements, the durability of the piston is one of the most important factors affecting the reliability of the engine, and improving the low engine oil consumption at the initial stage and in the durable service life can well ensure that the piston meets the requirements of emission regulations in the whole service life cycle.

Figure 3:
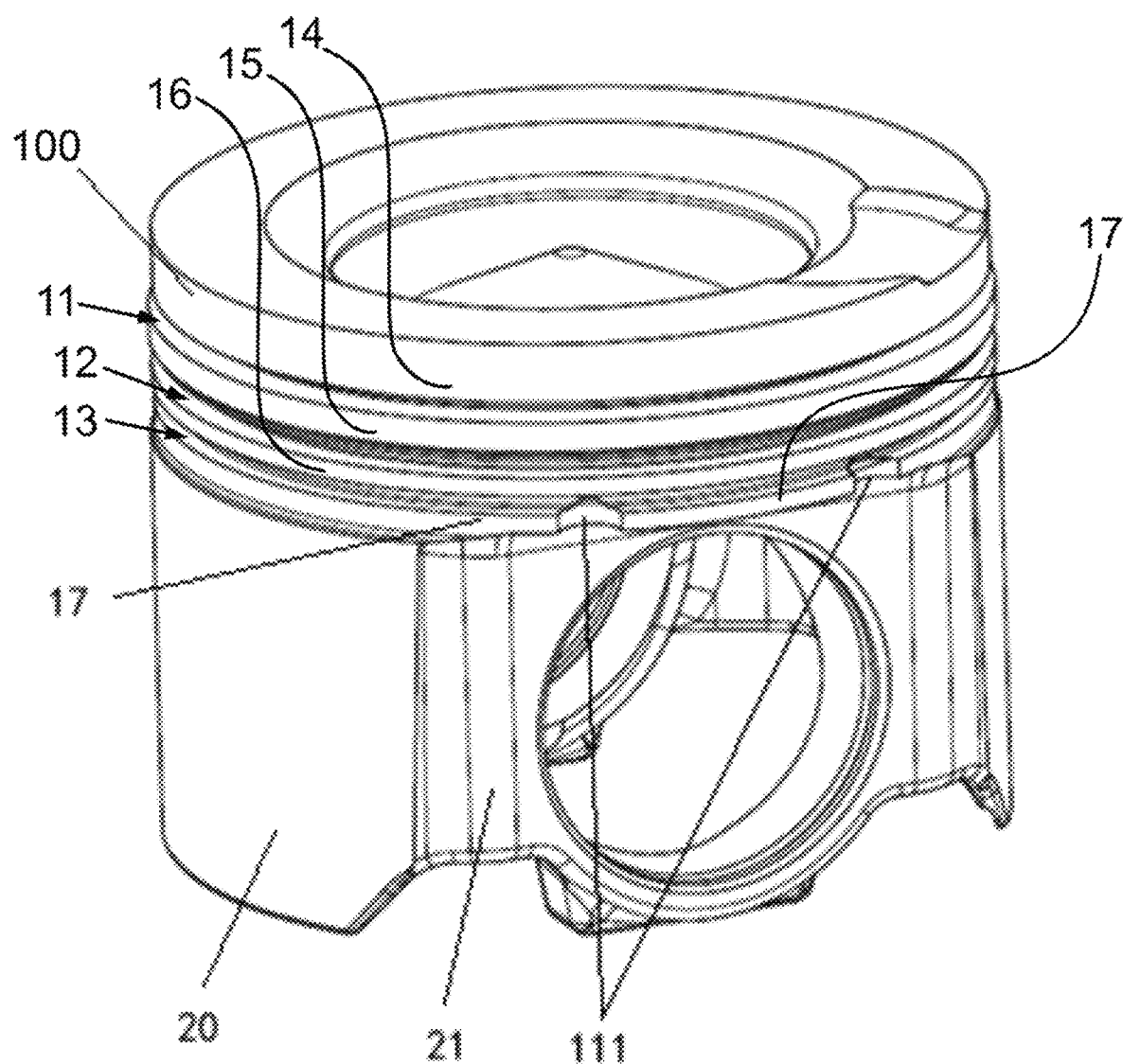
FIG. 3 is a structural schematic view of a piston having an oil return passage according to the utility model.
Figure 4:
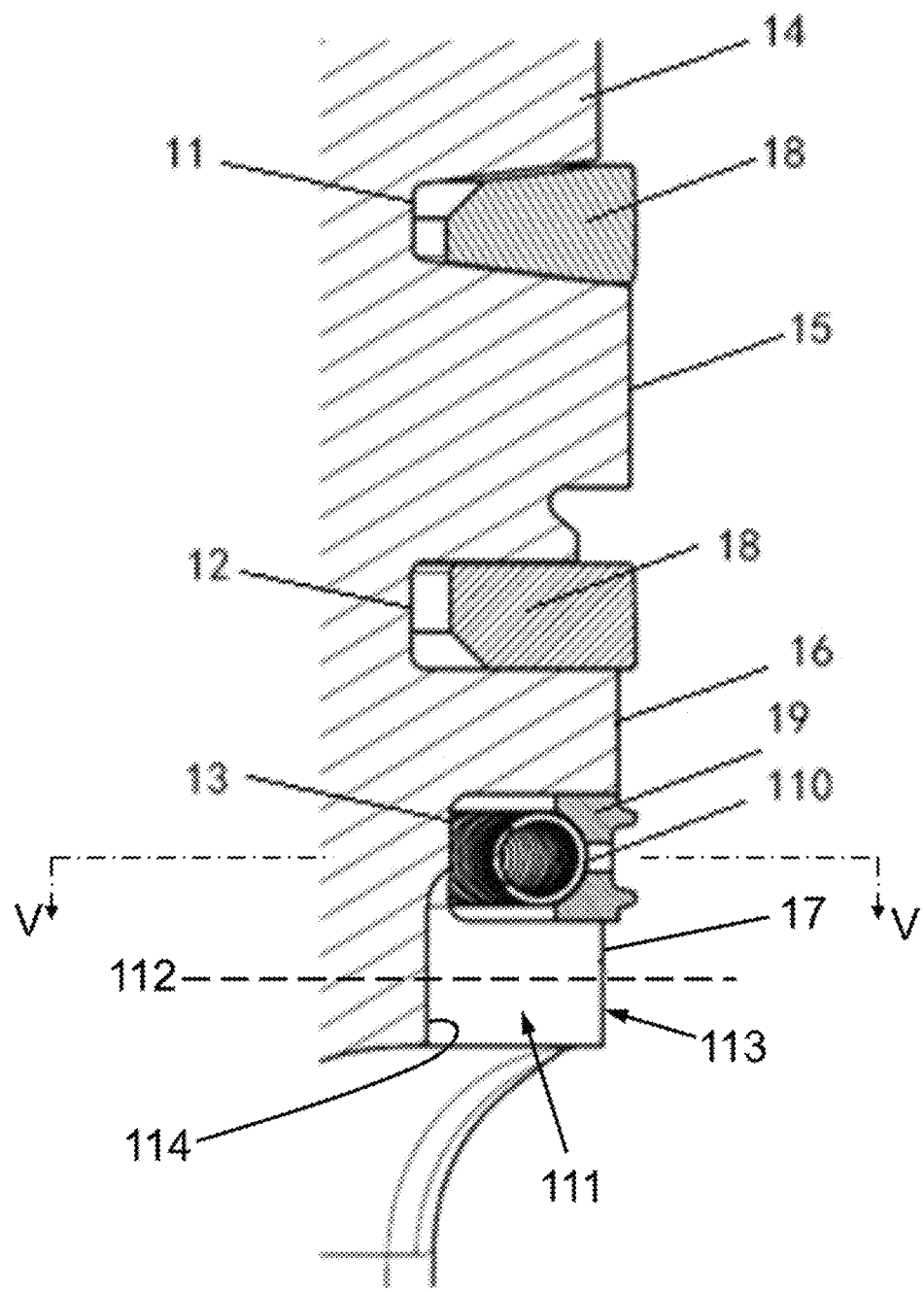
FIG. 4 is a cross-sectional view of a head of a piston having an oil return passage according to the utility model.
Figure 5:
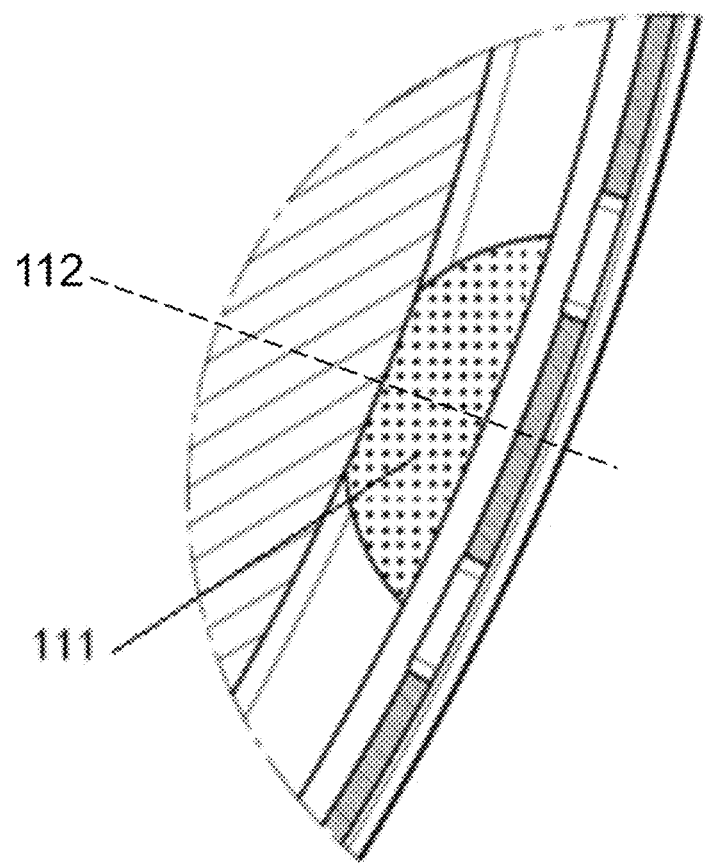
FIG. 5 is a schematic cross-sectional view, along line V-V of FIG. 4, of an oil return hole of a piston having an oil return passage according to the utility model.

The oil return hole has the function of effectively returning the engine oil in the cylinder, so that the lubricating oil such as the engine oil and the like is prevented from being carbonized and attached to the piston ring groove or the combustion chamber to influence the performance of the engine and reduce the service life of the engine. Therefore, as an important means for reducing the durability of the engine oil consumption, the oil return hole needs to be designed reasonably to improve the oil return ability. As shown in FIGS. 3 to 5, the present embodiment provides a piston having an oil return passage, which comprises a head 100 and a skirt 20 connected thereto, the head 100 is provided with a ring groove, the skirt 20 has a surface provided with a recessed surface window 21, and a remaining ring land 17 is formed at a connection between the surface window 21 and the ring groove; the remaining ring land 17 is provided with at least one oil return hole 111.

Specifically, the head 100 and the skirt 20 are both cylindrical and integrally formed.

The piston having the oil return passage is a steel piston.

More specifically, as shown in FIGS. 4 and 5, the ring grooves comprise a first ring groove 11, a second ring groove 12 and a third ring groove 13, the first ring groove 11 is close to a top of the head 100, the third ring groove 13 is close to the skirt 20, the second ring groove 12 is positioned between the first ring groove 11 and the third ring groove 13, a first ring land 14 is formed between a top of the head 100 and the first ring groove 11, a second ring land 15 is formed between the first ring groove 11 and the second ring groove 12, a third ring land 16 is formed between the second ring groove 12 and the third ring groove 13, and the remaining ring land 17 is formed between the third ring groove 13 and the skirt 20.

The first ring groove 11 is a wedge-shaped ring groove, the second ring groove 12 and the third ring groove 13 are rectangular ring grooves, the first ring groove 11 and the second ring groove 12 are internally provided with gas rings 18, and the third ring groove 13 is internally provided with an oil ring 19 and an oil ring supporting spring 110.

The second ring land 15 and the third ring land 16 each have a diameter greater than that of the first ring land 14.

Since the piston is a steel piston, the first ring groove 11, the second ring groove 12 and the third ring groove 13 can bear collision and friction with higher strength, and the piston can bear higher detonation pressure, so that the service life of the piston is longer.

Specifically, as shown in FIG. 3, the oil return hole 111 is arranged on the remaining ring land 17 and formed by milling the remaining ring land, an axis 112 of the oil return hole 111 extends along a radial direction of the piston, and an opening 113 of the oil return hole 111 has a size larger than that of a bottom 114 of the oil return hole 111, therefore, the oil return hole can be provided in the shape of a cone, a combination of a cylinder and a cone, and an arc surface. The oil return holes 111 are symmetrically distributed on the remaining ring land with a vertical plane where a central axis of a pin hole is located (that is, a direction perpendicular to a top surface of the piston) as a symmetry plane.

The present application adopts the milling mode at a position of the remaining ring land, and the oil return hole with a circular opening cross-section is machined by one-time feeding having a simple machining path, so that the whole new form of oil hole manufacturing has certain cost advantages. As shown in FIG. 5, in which the oil ring supporting spring 110 is not shown to provide a less obstructed view, the piston greatly increases the circulation cross-section area of the engine oil, and specifically at least increases by 1 time.

A difference between a depth of the oil return hole 111 and a diameter depth of the third ring groove 13 ranges from 0.5 mm to 1.0 mm. The oil return hole 111 has a diameter ranging from Ø8 mm to Ø15 mm.

The piston reduces the risk of burr production during machining, and avoids the risk that steel scraps are difficult to separate during machining.

A plurality of the oil return holes 111 are provided and the plurality of the oil return holes are symmetrically distributed on the remaining ring land. In a specific embodiment of the present application, two surface windows are oppositely arranged on the skirt 20, two remaining ring lands 17 are formed, and two oil return holes 111 are uniformly distributed on each remaining ring land 17.

In a specific implementation, the engine oil can flow to the surface window through the oil return hole to form an oil return passage, and then flow into the engine oil pan, so that the engine oil is difficult to accumulate and store in the oil return hole, and the problem that the engine oil accumulated and stored in the oil return hole is sucked to a combustion chamber is difficult to occur when the engine runs in an idling mode or runs at a low speed and in small load mode, thereby reducing the consumption of the engine oil and improving the problem of exhaust emission.

In a specific implementation, a plurality of oil storage holes may be uniformly distributed in a circumferential position of the third ring groove 13.

In a second aspect, an embodiment of the present disclosure provides an engine, further comprising the piston having the oil return passage described above.

In the implementation of the present application, when the piston reciprocates, the piston plays a role of oil scraping and oil distribution, for example, in the present application, a direction close to the head 100 is defined as a top direction, and a direction close to the skirt 20 is defined as a bottom direction; when the piston moves from top to bottom, the second ring land scrapes the engine oil to the oil return hole, and then the engine oil flows to the surface window, thus forming an oil return passage; when the piston moves from bottom to top, the ring land distributes the oil.

The above-mentioned is only specific embodiments of the present disclosure, but the protection scope of the present disclosure is not limited thereto, and the changes or substitutions that can be easily recognized by any person skilled in the art within the technical scope of the present disclosure shall be encompassed within the protection scope of the present disclosure. Therefore, the protection scope of the present disclosure shall be subject to the protection scope of the claims.

The invention claimed is:

1. A piston having an oil return passage, comprising:
   a piston head including a ring groove;
   a piston skirt connected to the piston head, the piston skirt having a surface including a concave face window, a remaining ring land formed at a connection between the face window and the ring groove; and
   an oil return hole disposed in the remaining ring land and formed by milling the remaining ring land;
   wherein the oil return hole connects the ring groove close to the piston skirt with the face window; and
   wherein a depth of the oil return hole is greater than a depth of the ring groove.

2. The piston according to claim 1, wherein a size of an opening of the oil return hole is larger than a size of a bottom of the oil return hole.

3. The piston according to claim 2, wherein an axis of the oil return hole extends along a radial direction of the piston.

4. The piston according to claim 3, further comprising a plurality of oil return holes including the oil return hole, wherein the plurality of oil return holes are arranged symmetrically distributed on the remaining ring land.

5. The piston according to claim 1, wherein a difference between the depth of the oil return hole and the depth of the ring groove is 0.5 mm to 1.0 mm.

6. The piston according to claim 1, wherein the oil return hole has a diameter of Ø 8 mm to Ø 15 mm.

7. The piston according to claim 1, further comprising (i) a plurality of ring lands including a first ring land, a second ring land, and the remaining ring land and (ii) a plurality of ring grooves including the ring groove, wherein:

the plurality of ring grooves includes at least one gas ring groove and at least one oil ring groove;
the at least one gas ring groove is disposed above the at least one oil ring groove; and
the first ring land is arranged between the at least one gas ring groove and a top of the piston head, the second ring land is arranged between the at least one gas ring groove and the at least one oil ring groove, and the remaining ring land is arranged between the at least one oil ring groove and the piston skirt.

8. The piston according to claim 7, wherein:
the at least one gas ring groove is at least one of a wedge-shaped ring groove and a rectangular ring groove, and is internally provided with a gas ring; and
the at least one oil ring groove is a rectangular ring groove and is internally provided with an oil ring and an oil ring supporting spring.

9. An engine, comprising the piston according to claim 1.

10. The piston according to claim 1, further comprising at least one gas ring groove and a plurality of ring lands, wherein:
the ring groove is an oil ring groove;
the at least one gas ring groove is disposed between a top of the piston head and the oil ring groove; and
the plurality of ring lands includes:
   a first ring land arranged between the at least one gas ring groove and the top of the piston head;
   a second ring land arranged between the at least one gas ring groove and the oil ring groove; and
   the remaining ring land.

11. The piston according to claim 10, further comprising:
a gas ring arranged at least partially in the at least one gas ring groove;
an oil ring arranged at least partially in the oil ring groove; and
an oil ring supporting spring arranged in the oil ring groove.

12. The piston according to claim 10, wherein a diameter of the second ring land is greater than a diameter of the first ring land.

13. The piston according to claim 1, further comprising a plurality of gas ring grooves, wherein:
the ring groove is an oil ring groove; and
the plurality of gas ring grooves includes:
   a rectangular-shaped gas ring groove; and
   a wedge-shaped gas ring groove.

14. The piston according to claim 1, wherein the surface of the skirt is an outer circumferential surface.

15. The piston according to claim 1, wherein:
a difference between the depth of the oil return hole and the depth of the ring groove is 0.5 mm to 1.0 mm; and
a diameter of the oil return hole is 8 mm to 15 mm.

16. A piston with an oil return channel, comprising:
a piston head including a plurality of ring grooves;
a piston skirt connected to the piston head, the piston skirt having a surface including a concave face window;
a remaining ring land arranged between the face window and a ring groove of the plurality of ring grooves disposed closest to the piston skirt; and
at least one oil return hole disposed in the remaining ring land and fluidically connecting the ring groove and the face window;
wherein a depth of the at least one oil return hole is greater than a depth of the ring groove.

17. The piston according to claim 16, wherein the at least one oil return hole includes a plurality of oil return holes that are disposed evenly distributed along the remaining ring land.

18. The piston according to claim 16, further comprising a plurality of ring lands, wherein:
   the ring groove disposed closest to the piston skirt is an oil ring groove;
   the plurality of ring grooves includes a gas ring groove disposed between a top of the piston head and the oil ring groove; and
   the plurality of ring lands includes:
      a first ring land arranged between the gas ring groove and the top of the piston head;
      a second ring land arranged between the gas ring groove and the oil ring groove; and
      the remaining ring land.

19. The piston according to claim 18, further comprising:
a gas ring arranged at least partially in the gas ring groove;
an oil ring arranged at least partially in the oil ring groove; and
an oil ring supporting spring arranged in the oil ring groove.

20. The piston according to claim 16, wherein:
the ring groove disposed closest to the piston skirt is an oil ring groove;
the plurality of ring grooves includes:
   a rectangular-shaped gas ring groove; and
   a wedge-shaped gas ring groove.

\* \* \* \* \*